US008184533B2

(12) United States Patent  (10) Patent No.: US 8,184,533 B2
Jin et al.  (45) Date of Patent: May 22, 2012

(54) SYSTEMS AND METHOD FOR QUALITY OF SERVICE CONTROL OVER MULTIPLE ACCESSES

(75) Inventors: Haipeng Jin, Carlsbad, CA (US); Georgios Tsirtsis, London (GB); Gerardo Giaretta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 12/542,603

(22) Filed: Aug. 17, 2009

(65) Prior Publication Data

US 2010/0039936 A1  Feb. 18, 2010

Related U.S. Application Data

(60) Provisional application No. 61/089,689, filed on Aug. 18, 2008.

(51) Int. Cl.
*G01R 31/08* (2006.01)
(52) U.S. Cl. ....................................... 370/230
(58) Field of Classification Search ........... 370/229–240
See application file for complete search history.

(56) References Cited

U.S. PATENT DOCUMENTS 6,822,940 B1  11/2004  Zavalkovsky et al.
2005/0286540 A1  12/2005  Hurtta et al.

2009/0080330 A1*  3/2009  Lee et al. ....................... 370/230
2009/0109845 A1*  4/2009  Andreasen et al. ........... 370/230
2009/0245108 A1*  10/2009  Wu et al. ....................... 370/233

FOREIGN PATENT DOCUMENTS

WO  WO2005079292 A2  9/2005

OTHER PUBLICATIONS

Gao X., Wu G., Miki T.: "End-to-End QoS Provisioning in Mobile Heterogeneous Networks" IEEE Wireless Communications Magazine, vol. 11, No. 3, Jun. 2004, pp. 24-34, XP002550381.
International Search Report & Written Opinion—PCT/US2009/054203, International Search Authority—European Patent Office—Oct. 30, 2009.
Kee Chaing Chua et al: "Policy-based QoS architecture in the IP multimedia subsystem of UMTS" IEEE Network, IEEE Service Center, New York, NY, US, vol. 17, No. 3, May 1, 2003, pp. 51-57, XP011096831 ISSN: 0890-8044 the whole document.

* cited by examiner

*Primary Examiner* — Kwang B Yao
*Assistant Examiner* — Tung Q Tran
(74) *Attorney, Agent, or Firm* — François A. Pelaez

(57) ABSTRACT

Systems and methods for quality of service control over multiple accesses, more particularly quality of service control over multiple accesses via enhanced quality of service rules. A policy rules and charging function, or similar network entity, can include an indicator in a set of quality of service rules that instructs an access gateway to either setup the quality of service resources/initiate bearer setup immediately, or store the quality of service rules until a request for the quality of service resources s received from the UE or another predetermined event occurs.

22 Claims, 11 Drawing Sheets

SYSTEMS AND METHOD FOR QUALITY OF SERVICE CONTROL OVER MULTIPLE ACCESSES

CLAIM OF PRIORITY UNDER 35 U.S.C. §119

The present Application for Patent claims priority to Provisional Application No. 61/089,689 entitled "SYSTEMS AND METHOD FOR QUALITY OF SERVICE CONTROL OVER MULTIPLE ACCESSES" filed Aug. 18, 2008, and assigned to the assignee hereof and hereby expressly incorporated by reference herein.

BACKGROUND

1. Field

The present aspects relate to wireless communication devices, and more particularly, to systems and methods for quality of service control over multiple accesses.

2. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, etc.). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Area tracking within a wireless communication system enables a tracking area location for user equipment (e.g., mobile device, mobile communication apparatus, cellular device, Smartphone, etc.) to be defined. Typically, a network can request or page the user equipment (UE) in which the UE can respond with such tracking area location. This enables the tracking area location of the UE to be communicated and updated to the network.

Optimization of network coverage and service quality is constant goals for wireless network operators. Superior coverage and service quality results in enhanced user experiences, greater throughput, and ultimately increased revenue. There are ongoing efforts to provide for network coverage optimization. Optimization requires efficient use of network resources. Consequently, it would be desirable to have a method and/or system for increasing efficient distribution of resources in wireless networks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with quality of service control over multiple accesses. According to related aspects, a method for quality of service control over multiple accesses is provided. The method includes receiving at least one resource request for a set of data flows, generating a set of quality of service rules based at least in part on the resource request for the set of data flows, and including an indicator in the set of quality of services rules, wherein the indicator instructs a recipient of at least one of: receipt of the quality of service rules serves to trigger a bearer setup, or a recipient is to store the quality of service rules until a predetermined event occurs.

Another aspect relates to a wireless communication apparatus having a first module for obtaining at least one resource request for data flows, wherein the request has been relayed via a network entity, a second module for determining a set of quality of service rules based at least in part on the resource request for data flows, and a third module for incorporating an indicator in the quality of services rules, wherein the indicator instructs a recipient that at least one of: receipt of the quality of service rules serves to trigger a bearer setup, or the recipient is to store the quality of service rules until the recipient receives a request for bearer setup.

Yet another aspect relates to a computer program product having a first set of codes for causing a computer to receive at least one network resource request, a second set of codes for causing the computer to determine a set of quality of service rules based at least in part on the network resource request, and a third set of codes for causing the computer to include an indicator in the quality of services rules, wherein the indicator instructs a recipient to at least one of: initiate establishment of a set of resources based on the quality of service rules, or store the quality of service rules until the recipient receives a request for resource establishment.

Still another aspect relates to an apparatus, including means for receiving at least one resource request for data flows, means for generating a set of quality of service rules based at least in part on the resource request for data flows, and means for including an indicator in the quality of services rules, wherein the indicator instructs a recipient of at least one of: receipt of the quality of service rules serves to trigger a bearer setup, or a recipient is to store the quality of service rules until a predetermined event occurs.

Moreover an additional aspect relates to a system for quality of service control over multiple accesses, including a request acquisition component that receives at least one resource request for a set of data flows for at least one mobile device, wherein the request for network access is relayed via an access gateway, a quality of service determination component that generates a set of quality of service rules for the resource request, and an indicator component that includes an indication with the quality of services rules, wherein the indication instructs the access gateway of at least one of:

receipt of the quality of service rules serves to trigger a bearer setup, or to store the quality of service rules until a predetermined event occurs.

Yet another aspect relates to a method for quality of service control over multiple accesses, including the steps of receiving a set of quality of service rules, including an indicator, in response to a resource request for data flows, and determining based on the indicator included with the set of quality of service rules to do at least one of: initiate resource establishment, or store the set of quality of service rules until a request for a set of quality of service resources is received.

Another aspect relates to a wireless communication apparatus, including a first module for receiving a set of quality of service rules, including an indicator, in response to a resource request, and a second module for at least one of storing the quality of service rules based at least in part on a value of the indicator, or generating a set of quality of service resources for the quality of service rules based at least in part on the value of the indicator.

Yet another aspect relates to a computer program product, that includes a first set of codes for causing a computer to forward a resource request for a set of data flows to a disparate network entity, a second set of codes for causing the computer to receive from the disparate network entity a set of quality of service rules in response to the resource request for the set of data flows, and a third set of codes for causing the computer to at least one of store the quality of service rules based at least in part on a value of the indicator, or generate a set of quality of service resources for the quality of service rules based at least in part on the value of the indicator.

Still another aspect relates to an apparatus, having means for receiving a set of quality of service rules, including an indicator, in response to a resource request for one or more data flows, and means for determining based on the indicator included with the set of quality of service rules to do at least one of: initiate resource establishment, or store the set of quality of service rules until a request for a set of quality of service resources is received.

Moreover an additional aspect relates to a system for quality of service control over multiple accesses, that includes a quality of service reception component that acquires a set of quality of service rules from a policy and charging resource function server, and an indication component that interprets an indicator included in the quality of service rules, and determines based on the indicator to at least one of initiate a bearer setup with a mobile device, or store the quality of service rules until receipt of a request for quality of service resources from the mobile device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE ATTACHMENTS

DETAILED DESCRIPTION

Figure 1:
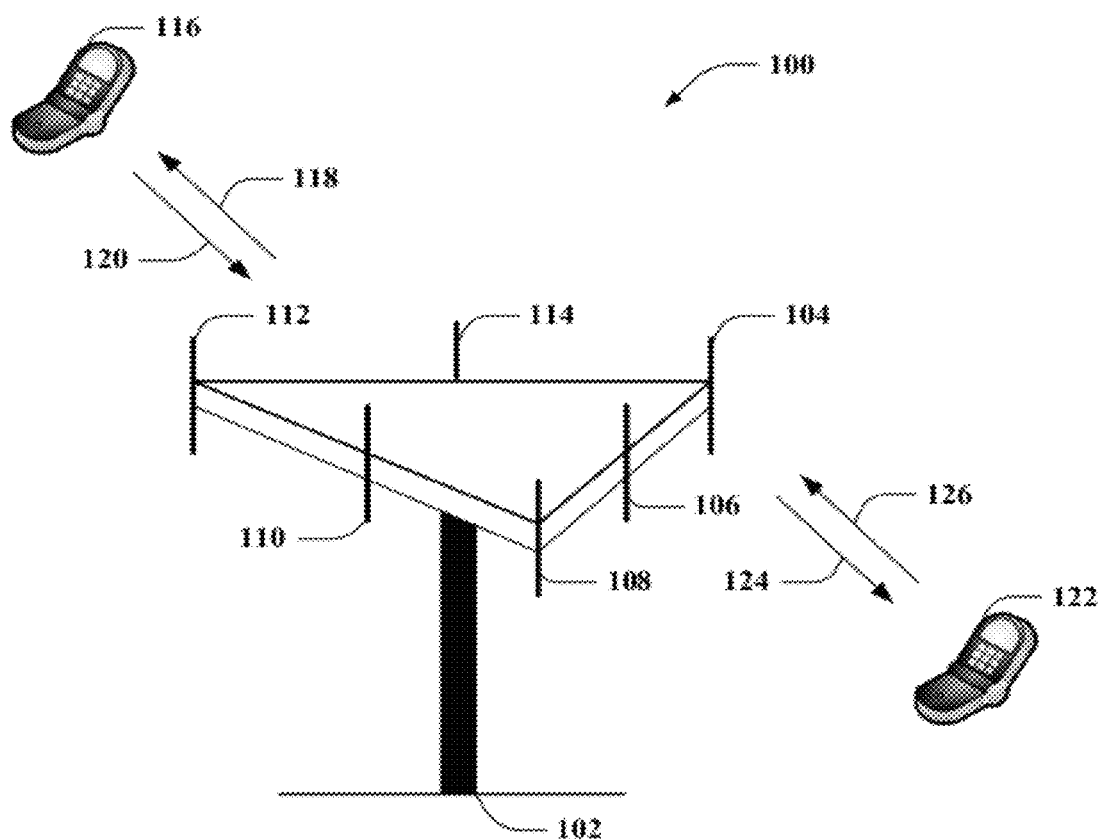
FIG. 1 illustrates an exemplary multiple access wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident; however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, eNodeB or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Additionally, while embodiments are generally described with respect to a communications system, those skilled in the art will recognize that the embodiments can be applied to any design employing finite-precision arithmetic, including both fixed-point and floating-point data representations. It is to be appreciated that the systems and/or methods described herein can be employed with any suitable type of design and all such types of design(s) are intended to fall within the scope of the hereto appended claims.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beam-forming to improve signal-to-noise ratio of forward links 118 and 124 for mobile devices 116 and 122. This can be provided by using a precoder to steer signals in desired directions, for example. Also, while base station 102 utilizes beam-forming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology in one example.

According to an example, system 100 can be a multiple-input multiple-output (MIMO) communication system. Further, system 100 can utilize substantially any type of duplexing technique to divide communication channels (e.g., forward link, reverse link, etc.) such as FDD, TDD, and the like. Moreover, the system 100 can be a multiple-bearer system. A bearer can be an information path of defined capacity, delay, bit error rate, etc. Mobile devices 116 and 122 can each serve one or more radio bearers. The mobile devices 116 and 122 can employ uplink rate control mechanisms to manage and/or share uplink resources across the one or more radio bearers. In one example, the mobile devices 116 and 122 can utilize token bucket mechanisms to serve the radio bearers and to enforce uplink rate limitations.

Pursuant to an illustration, each bearer can have an associated prioritized bit rate (PBR), maximum bit rate (MBR) and guaranteed bit rate (GBR). The mobile devices 116 and 122 can serve the radio bearers based, at least in part, on the associated bit rate values. The bit rate values can also be employed to calculate queue sizes that account for PBR and MBR for each bearer. The queue sizes can be included in uplink resource requests transmitted by the mobile devices 116 and 122 to the base station 102. The base station 102 can schedule uplink resources for mobile device 116 and 122 based upon respective uplink requests and included queue sizes.

Figure 2:
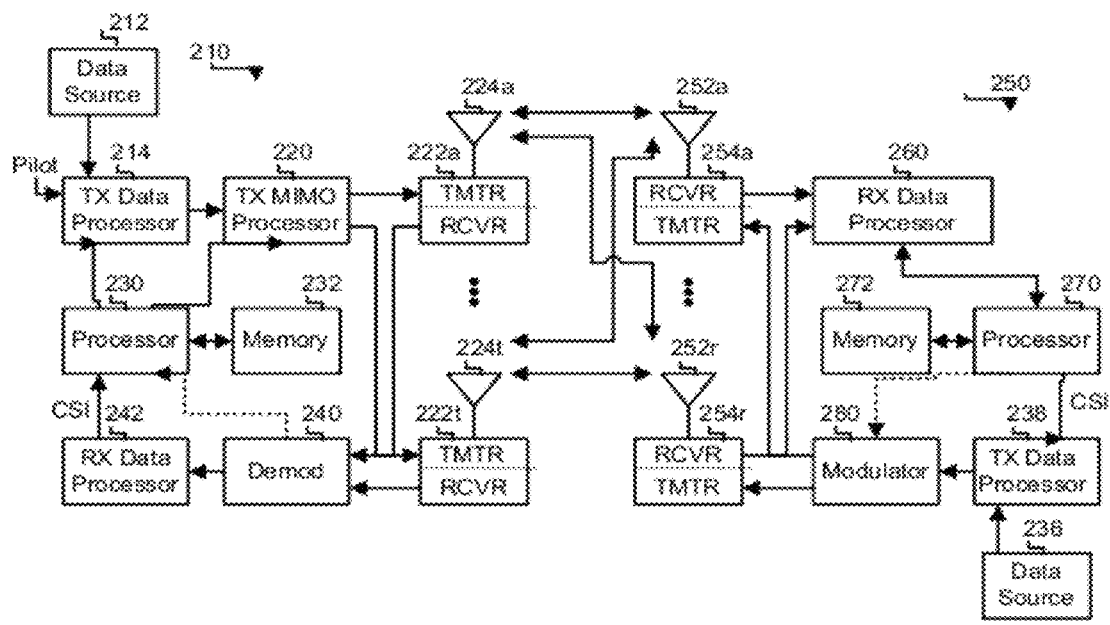
FIG. 2 illustrates a general block diagram of a communication system.

FIG. 2 is a block diagram of a transmitter system 210 (also known as the access point) and a receiver system 250 (also known as access terminal) in a MIMO system 200. At the transmitter system 210, traffic data for a number of data streams is provided from a data source 212 to a transmitter (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beam-forming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beam-forming weights then processes the extracted message.

Figure 3:
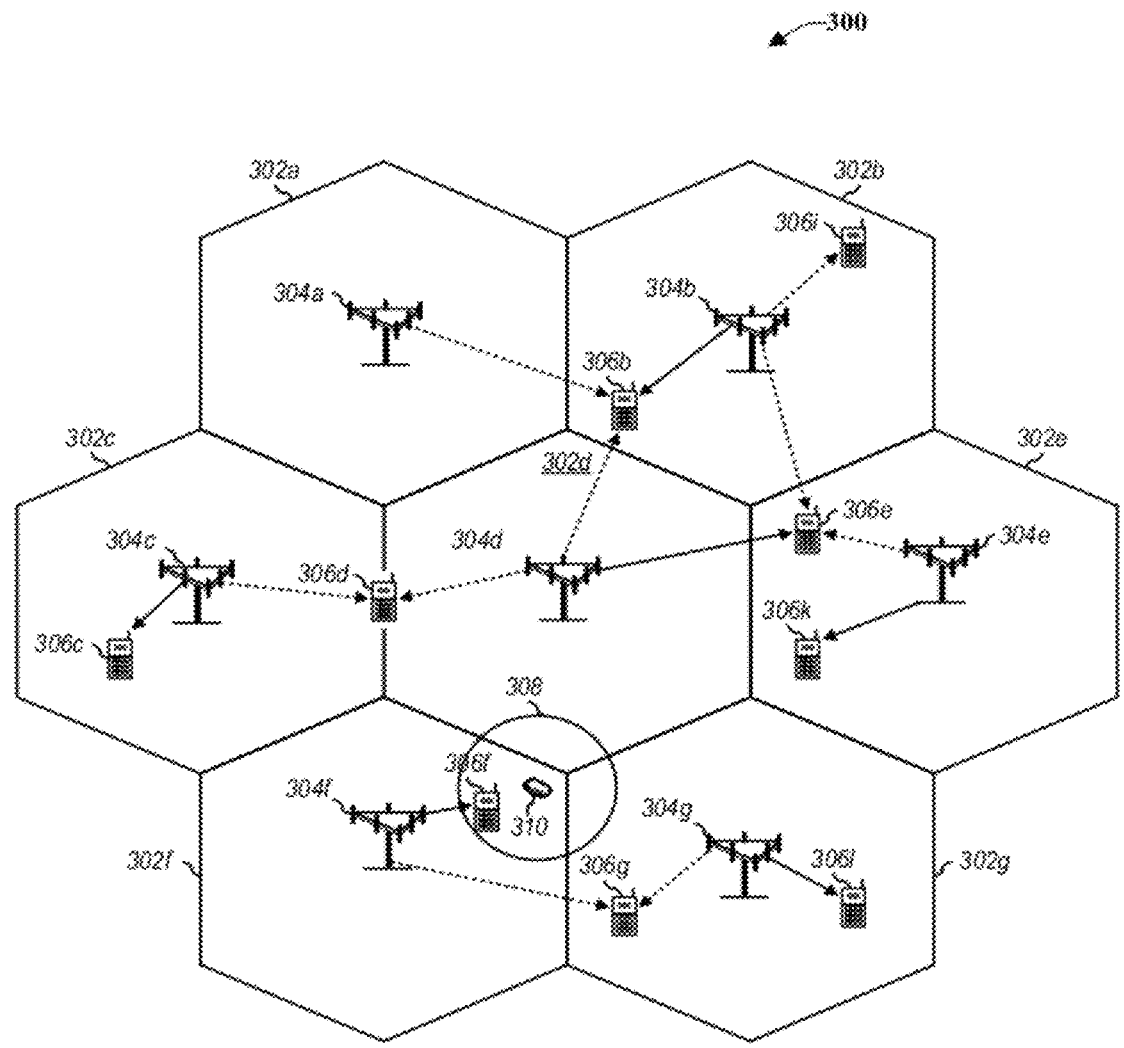
FIG. 3 illustrates an exemplary wireless communication system.

FIG. 3 illustrates an exemplary wireless communication system 300 configured to support a number of users, in which various disclosed embodiments and aspects may be implemented. As shown in FIG. 3, by way of example, system 300 provides communication for multiple cells 302, such as, for example, macro cells 302a-302g, with each cell being serviced by a corresponding access point (AP) 304 (such as APs 304a-304g). Each cell may be further divided into one or more sectors (e.g. to serve one or more frequencies). Various access terminals (ATs) 306, including ATs 306a-306k, also known interchangeably as user equipment (UE) or mobile stations, are dispersed throughout the system. Each AT 306 may communicate with one or more APs 304 on a forward link (FL) and/or a reverse link (RL) at a given moment, depending upon whether the AT is active and whether it is in soft handoff, for example. The wireless communication system 300 may provide service over a large geographic region, for example, macro cells 302a-302g may cover a few blocks in a neighborhood.

The cells 302 can provide coverage via a plurality of networks, such as GSM/GPRS/Edge network (hereinafter referred to as "2G network"), and/or UMTS network (hereinafter referred to as "WCDMA coverage," "3G network," or simply as "3G"). The system 300 can have one or more networks in the cells, and a plurality of neighboring cells 302 (discussed supra) each containing one or more networks. An intersystem handover occurs when the ATs 306 are initially connected to a first network in a cell and switch to a second network in the same cell. Conversely, an intra-system handover occurs when the ATs 306 travels from a first cell to a neighboring cell, and connects to one or more of the networks contained in the second cell.

In addition, the ATs 306 located in the wireless communication system 300 can have access to a plurality of access networks, including a wireless local area network (WLAN), and so forth. For example, the AT 306f is located in the cell 302f including the AP 304f. As discussed previously, the AP 304f can enable coverage via multiple wireless communication networks (e.g., WCDMA, 3G, etc.). Additionally, a wireless router 310 is located in the cell 302f, wherein the wireless router 310 can enable communication via an additional or alternative access network, including but not limited to a wireless local area network (WLAN). As illustrated, the AT 306f is simultaneously located in the coverage area of the cell 302f and a coverage area 308 of the wireless router 310. As discussed infra, the AT 306f can connect to the access networks associated with the cell 302f and the wireless router 310 simultaneously, or independently.

Figure 4:
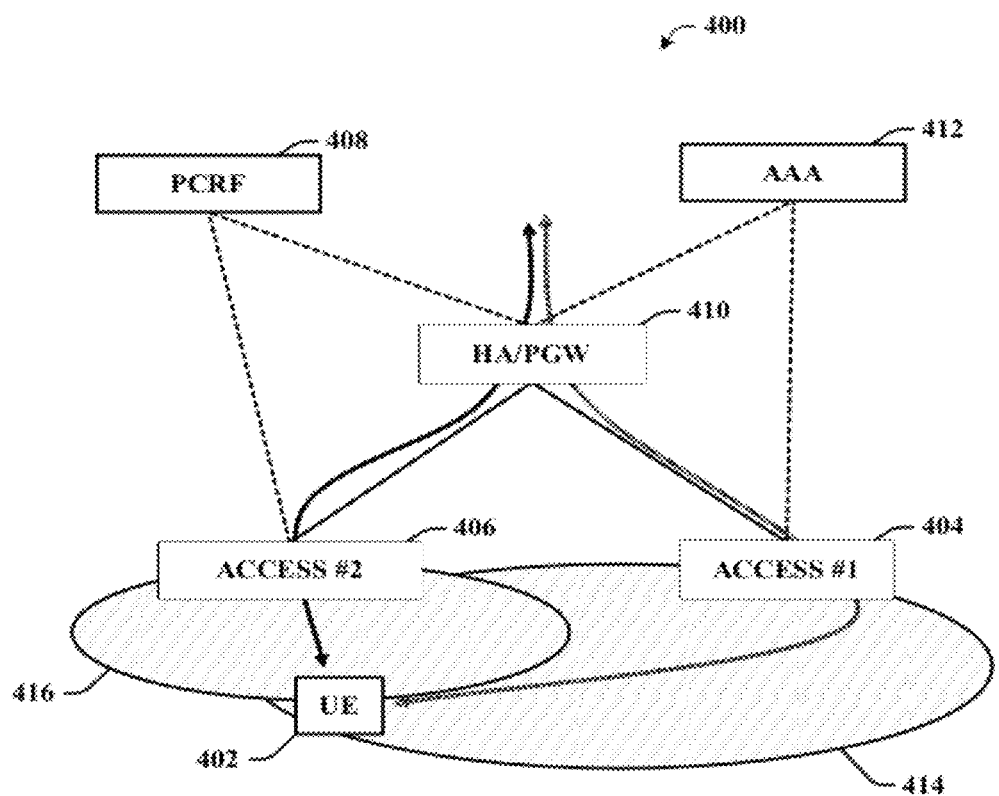
FIG. 4 illustrates a wireless communication system in accordance with an aspect of the subject specification.

FIG. 4 is an example wireless communication system 400 illustrating network access through multiple access gateways in accordance with an embodiment of the subject innovation. The system 400 includes a mobile device 402 (e.g., user equipment, wireless device, mobile device, smart phone, PDA, GPS device, laptop, etc.), a first access gateway (AGW) for a first access technology 404, a second access AGW for a second access technology 406, a policy charging rules function component (PCRF) 408, a home agent/packet data gateway (HA/PGW) 410, and an authentication, authorization, and accounting component (AAA) 412.

The AGW 404 (e.g., the access gateway for the first access technology) has a coverage range 414, and the AGW 406 (e.g., the access gateway for the second access technology) has a coverage range 416. The first and second access technologies can include virtually any existing or new access technologies, for example, CDMA2000, UMTS, LTE, WLAN, WiMax, etc. As illustrated, when the mobile device 402 (referred to hereinafter as 'UE') is located in overlapping regions of the first AGW's 404 coverage range 414 and the second AGW's 406 coverage range 416; the UE 402 can communicate with either or both the first access AGW 404, and the second AGW 406.

The first AGW 404 and the second AGW 406 enable the UE 402 to connect to a communication infrastructure, such as the Internet, through a plurality of access technologies such as an LTE network, a WLAN network, and so forth. In operation, typically, the UE 402 requests resources, or quality of service (QoS) resources, to be set up within the access networks (e.g., AGW 404 and/or 406) in order to ensure proper quality of communications for any packet/internet protocol (IP) data flows. Whenever an UE 402 request a set of resources or QoS from an access network, the request is sent, communicated, or otherwise transmitted through a gateway (e.g., ACCESS #1 404, ACCESS #2 406, Home Agent/P-gateway 410, etc.) to the PCRF 408, wherein the PCRF 408 determines whether the UE 402 is allowed to use the set of resources (e.g., QoS). The AAA component 412 authenticates and authorizes the UE 402 to ensure that the UE 402 is allowed to receive packet data access services from the various gateways (e.g. AGW 404, AGW 406 or HA/PGW 410), and facilitates performing accounting accordingly. For example, the UE 402 can obtain an internet protocol (IP) address from the HA/PGW 410, and connect to the Internet. In addition, the AGWs 404 and 406 enforce a set of quality of service rules (QoS rules) regarding the services (e.g. functionality, applications, etc.) that can be used by the UE 402, and how to charge the UE 402 for use of the services.

In operation, the PCRF 408 receives information from the gateways (e.g., 404, 406, or 410), or an application function in the network, such as an application request, and based on the received information the PCRF 408 derives the QoS rules. Subsequently, the PCRF 408 passes the QoS rules to the AGWs 404 and 406. The AGWs 404 and 406 each setup quality of service (QoS) resources based on the QoS rules received from the PCRF 408 for the IP flows involved in the process. In addition, during a handover (discussed supra), the PCRF 408 can push the QoS rules to one or more new AGW (s) that the UE 402 may be attached to. For instance, if the UE 402 is established on the first AGW 404 and moving to the second AGW 406, then the PCRF 408 will push the QoS rules, which were previously provisioned on the first AGW 404, to the second AGW 406.

Figure 5:
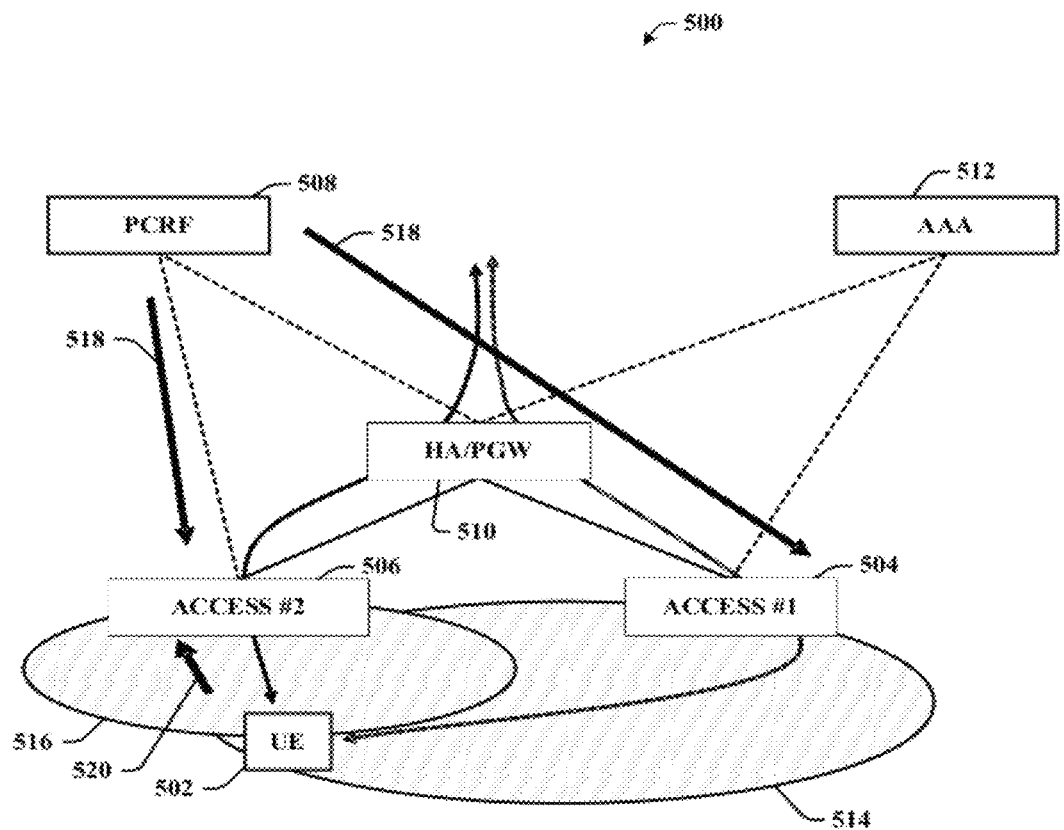
FIG. 5 illustrates a wireless communication system in accordance with an aspect of the subject specification.

FIG. 5 is an example wireless communication system 500 illustrating network access through multiple access gateways, in which various disclosed embodiments and aspects may be implemented. The system 500 includes a user equipment (UE) 502 (e.g. wireless device, mobile device, laptop, smart phone, PDA, GPS device, personal music player, etc.), a first access gateway (AGW) 504, a second (AGW) 506, a policy charging rule function component (PCRF) 508, a home agent/ packet gateway (HA/PGW) 510, and an authentication authorization account component (AAA) 512.

As discussed previously, the UE 502 can be connected to either or both the first AGW 504 and the second AGW 506, depending on the UE's 502 location within the coverage ranges 514 and 516. The UE 502 can connect to one or more communication infrastructures (e.g., the Internet) through the AGWs 504 and 506 using one or more technologies. The AGWs 504 and 506 can acquire a set of QoS rules from the PCRF 508 and establish QoS for the UE 502 based on the QoS rules.

Typically, the PCRF 508 provides a global set (e.g., a general set) of QoS rules to each AGW that is connected to the UE 502, and each connected AGW will setup QoS resources based on the global set of QoS rules. As a result, the same QoS rules may be provided by the PCRF 508 to both the AGW 504 and the AGW 506. Even though the UE 502 may be connected to multiple AGWs, the UE 502 typically uses one AGW for a particular packet/IP data flow at a time. In another case, when the UE 502 is handing off from one AGW 504 to the other AGW 506, the UE 502 may use only one AGW for all service data flows at one time. However, the QoS rules typically do not contain any information for use by the AGWs to determine whether the service data flow(s) corresponding to a QoS rule is active on a particular AGW (e.g., AGW1 or AGW2). Consequently, each connected AGW will setup QoS resources based on all the QoS rules even if some of the packet/IP data flows are not active on an access. For instance, the UE 502 can be connected to AGW 504 and AGW 506 simultaneously, and despite only using AGW 504 or AGW 506 at a time, both AGWs 504 and 506 receive the same set of global QoS rules. In addition, both AGWs 504 and 506 setup QoS resources (e.g., bearer setup) based on the global set of QoS rules. It can be appreciated that the foregoing can result in an inefficient use of system resources.

In accordance with one or more aspects of the present innovation, the PCRF 508 provides a set of QoS rules 518 with indications to each of the connected AGWs 504 and 506. The indications included with the QoS rules 518 can contain specific instructions for each AGW 504 and 506 to indicate whether the AGW needs to setup the QoS resources for the packet/IP data flows related to the QoS rules or not. In addition, the indications can contain instructions regarding when the AGWs 504 and 506 should establish the QoS resources. For instance, the UE 502 can be connected to AGW 504 and AGW 506 simultaneously, wherein the AGW 504 is a gateway (GW) within a mobile cellular network and AGW 506 is the GW for a WLAN network. The UE 502 may desire to use the AGW 504 for an audio communication segment of a video conference, and the AGW 506 for a video communication segment of the video conference. The PCRF 508 can communicate a set of QoS rules 518, including one or more indications specifying one or more parameters of QoS setup for each AGW 504 and 506. Even though the PCRF provides QoS rules for both audio component and the video component to both of the AGWs, the PCRF 508 can indicate in the QoS rules to the AGW 504 that only resources for the IP data flow related to the audio component needs to be allocated while the resources for the IP data flow related to the video component do not need to be allocated; on the other hand, the PCRF 508 can indicate in the QoS rules to the AGW 506 that only resources for the IP data flow related to the video component needs to be allocated while the resources for the IP data flow related to the audio component do not need to be allocated. Subsequently, the AGW 504 can setup a QoS for the audio communication segment of the video conference, and the AGW 506 can setup a QoS for the video communication segment of the video conference.

Moreover, the set of QoS rules 518 can include indications instructing the AGWs 504 and 506 whether the QoS rules 518 are for authorization and/or enforcement, or whether the AGW 504 or 506 should trigger a bearer setup. The UE 502 can decide where to perform a UE 502 initiated bearer 520 or not for certain service data flows, and the procedure can be authorized by the AGW 504 or 506 based on the QoS rules 518 received. UE initiated bearer setups are based on routing decisions by the UE 502. Consequently, the UE 502 can use either AGW 504 or 506 for virtually any up-link flow, and the HA/PGW 510 can use either AGW 504 or 506 for virtually any downlink flow.

Additionally or alternatively, the PCRF 508 can communicate a separate set of QoS Rules to each AGW 504 and 506. For instance, the UE 502 can be simultaneously connected to both AGW 504 and 506, wherein both AGW 504 and 506 are base stations. The PCRF 508 can communicate a first set of QoS rules 518 to the AGW 504 instructing it to setup QoS for voice and data service, and a second set of QoS rules 518 for the AGW 506 instructing it to setup QoS for video services or simply indicate not to setup QoS resource for the UE 502 until further instructed.

Figure 6:
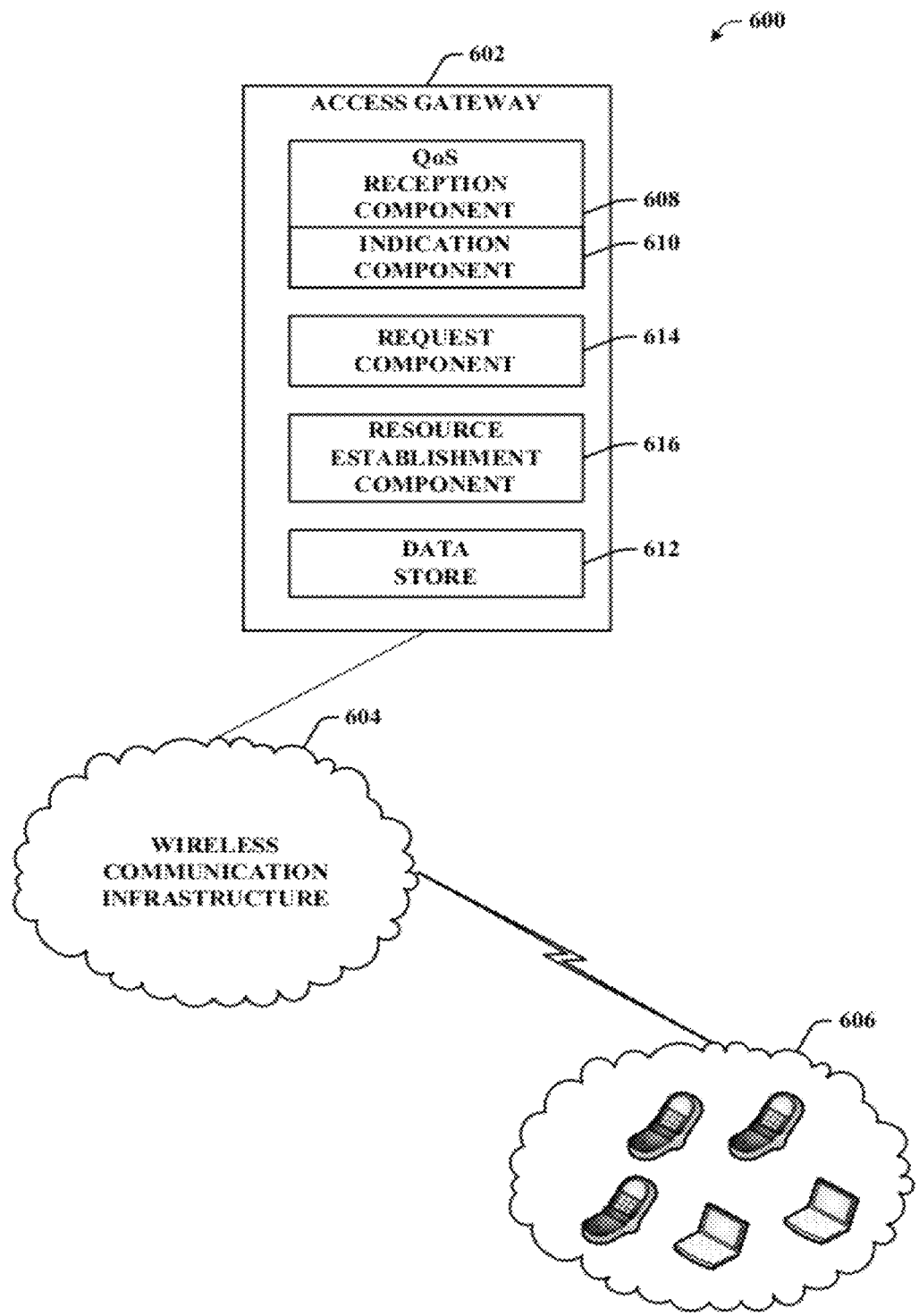
FIG. 6 illustrates an example access gateway in accordance with an aspect of the subject specification.

FIG. 6 illustrates an example access gateway in accordance with an aspect of the subject innovation. The system 600 includes an access gateway 602, a wireless communication infrastructure 604, and a set of mobile devices 606. As discussed previously, the access gateway 602 enables one or more of the mobile devices 606 (UEs) to communicate with the wireless communication infrastructure 604, wherein the wireless communication infrastructure 604 can include a communication framework, such as the Internet, and so forth.

In operation, one or more of the UEs 606 can attempt to access the wireless communication infrastructure 604 via the access gateway 602. During an attempt to access the wireless communication infrastructure 604, for example, to place a voice over internet protocol (VoIP) call, the UEs 606 and the access gateway 602 typically negotiate a set of bearers between them to carry data packets (packets), this is also referred to as a bearer setup. As part of the bearer negotiations, specific Quality of Service (QoS) parameters or rules related to the bearers are determined. For instance, the QoS rules can include data rate parameters, and so forth. The negotiated bearers having a set of associated QoS requirements can be referred to as QoS resources (e.g., resources), wherein the UEs 606 can communicate with access gateway 602 via the QoS resources.

The access gateway 602 includes a QoS reception component 608 that can receive, acquire, or otherwise obtain a set of QoS rules for one or more UEs 606. As discussed above, typically, the access gateway 602 receives a connection request from a UE 606, and relays the connection request to a policy and charging rules function server (PCRF), wherein the PCRF (not shown) determines the QoS resources that the UE 606 is allowed to use, and the manner in which to charge for those resources. The PCRF can also receive service information from an application function within the network, wherein the PCRF determines the QoS resources that the UE 606 is allowed to use for that service and the manner in which to charge for those resources. The PCRF sends a set of QoS rules to the access gateway 602 identifying the allowable QoS resources for that particular UE 606, wherein the QoS reception component 608 can translate, decode, or otherwise interpret the QoS rules.

Typically, the access gateway 602 assumes that the UE 602 should have access to the resources almost immediately, and will setup the QoS and all resources at that time. In accordance, with an aspect of the subject innovation, the access gateway 602 can maintain the QoS and resources until requested by the UE 602. For example, if the PCRF (discussed supra) is connected to a plurality of access networks (via an access gateway) that the UE is requesting service from, and the PCRF provides the same QoS rules (e.g., global QoS rules) to each access network for the UE 602, and typically, each access gateway will setup the QoS virtually right away. However, even if the UE 606 is connected to each access network it may only use one access network at a time for a particular IP flow. In this case, the PCRF can include a wait indicator (e.g., flag, chunk of code, etc.) in the QoS rules that instruct the access gateway 606 to store the QoS rules, and setup the QoS resources upon receipt of a request from the UE 606, or upon receipt of an updated (e.g., modified) set of QoS rules from the PCRF changing the indicator. The QoS reception component 608 includes an indication component 610 that facilitates translating (e.g., detecting) the indicator included, if at all, with the QoS rules received from the PCRF.

In addition, the access gateway 602 includes a data store 612 that can maintain or store QoS rules. A request component 614 can obtain, acquire, or otherwise receive one or more request for QoS resources from the UE 606, and upon receipt retrieve the QoS rules from the data store 612. A resource establishment component 616 can generate a set of QoS resources to be used by the UE 606 based at least in part on the provision of QoS rules from the PCRF. It is to be appreciated that the access gateway 602 does not have to send a separate request for QoS to the PCRF under the foregoing scheme. In addition, each access network (e.g., access gateway 602) receiving the QoS rules from the PCRF can be prepared to accommodate virtually any flow, because the QoS rules for one or more UEs 606 can be stored in the data store 612 until the UEs 606 request resources from the access gateway 602.

Figure 7:
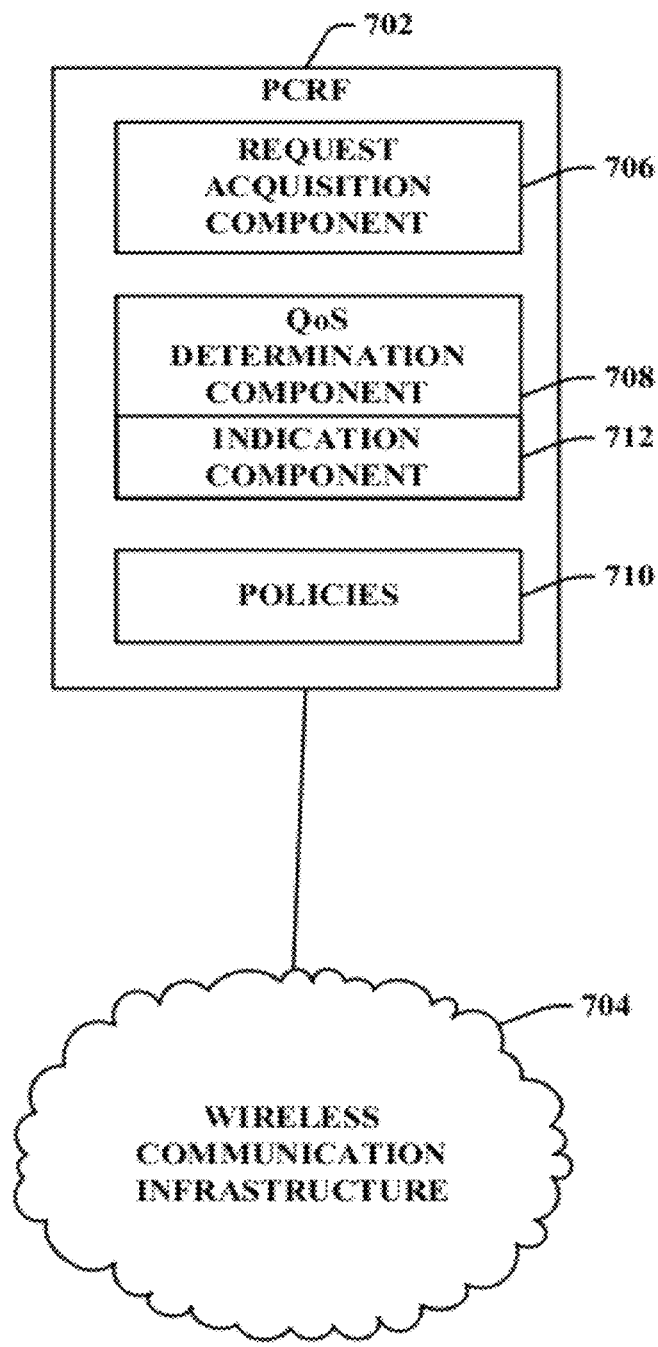
FIG. 7 illustrates an example policy and charging rules function server in accordance with an aspect of the subject specification.

FIG. 7 is an example policy and charging rules function server in accordance with an aspect of the present innovation. The policy and charging rules function (PCRF) server 702 is an entity typically located in the core of a wireless network (e.g., network server), and can make determinations as to the QoS resources that one or more UEs has permission to use on the wireless network. For example, a UE (see FIG. 6) can attempt to connect to an access network via an access gateway (see FIG. 6), and the access gateway forwards the connection request to the PCRF 702, wherein the PCRF 702 determines the services (e.g., QoS resources) that the UE can use, and sends a set of QoS rules to the access gateway identifying the QoS resources that the UE has permission to use.

The PCRF 702 can include a request acquisition component 706 that can obtain, acquire, or otherwise receive one or more connection request forwarded, relayed, or otherwise communicated from an access gateway, wherein the connection request originate from a UE. The PCRF may also receive service request from an application function within the network, wherein the service request includes service information negotiated by the UE. In addition, the PCRF 702 can include a QoS determination component 708 that can analyze the connection request, and based at least in part on the connection request, an identity of the requesting UE, an identity of the relaying access gateway, and/or a set of policies 710 determine a set of QoS resources that the UE has permission to utilize. For example, the requesting UE may be attempting to access the Internet, and based on the identity of the requesting UE, the QoS determination component 708 can determine that the requesting UE has permission to access the internet, and forward to the relaying access gateway a set of QoS rules for the QoS resources, including packet delay parameters, packet loss parameters, data rate parameters, and so forth.

In addition, the QoS determination component 708 can include an indicator component 712 that can incorporate, attach, or otherwise include at least one indicator into the set of QoS rules, wherein the indicator instructs the relaying access gateway to store the QoS rules until the associated UE requests the resources from the access gateway. As discussed previously, typically, the access gateway assumes that the UE should have access to the resources almost immediately, and will setup the QoS and all resources at that time. Based on the indicator included with the transmitted QoS rules, the access gateway can maintain the QoS rules, and wait to setup the resources until requested by the UE. For example, if the PCRF (discussed supra) is connected to a plurality of access networks (via an access gateway) that the UE is requesting service from, and the PCRF provides the same QoS rules to each access network for the UE, typically, each access gateway will setup the QoS virtually right away. However, even if the UE is connected to each access network it may only use one access network at a time for a particular IP flow. In this case, the indicator component 712 can include a wait indicator (e.g., flag, chunk of code, etc.) in the QoS rules that instruct the access gateway to store the QoS rules, and setup the QoS resources upon receipt of a resource request from the UE. Additionally or alternatively, the indicator can instruct the access gateway to setup the resources for a subset of the QoS rules. For example, the UE may use multiple access gateways for different portions of a wireless communication session, in which case the access gateway does not need to setup QoS resources for the entire communication session.

Figure 8:
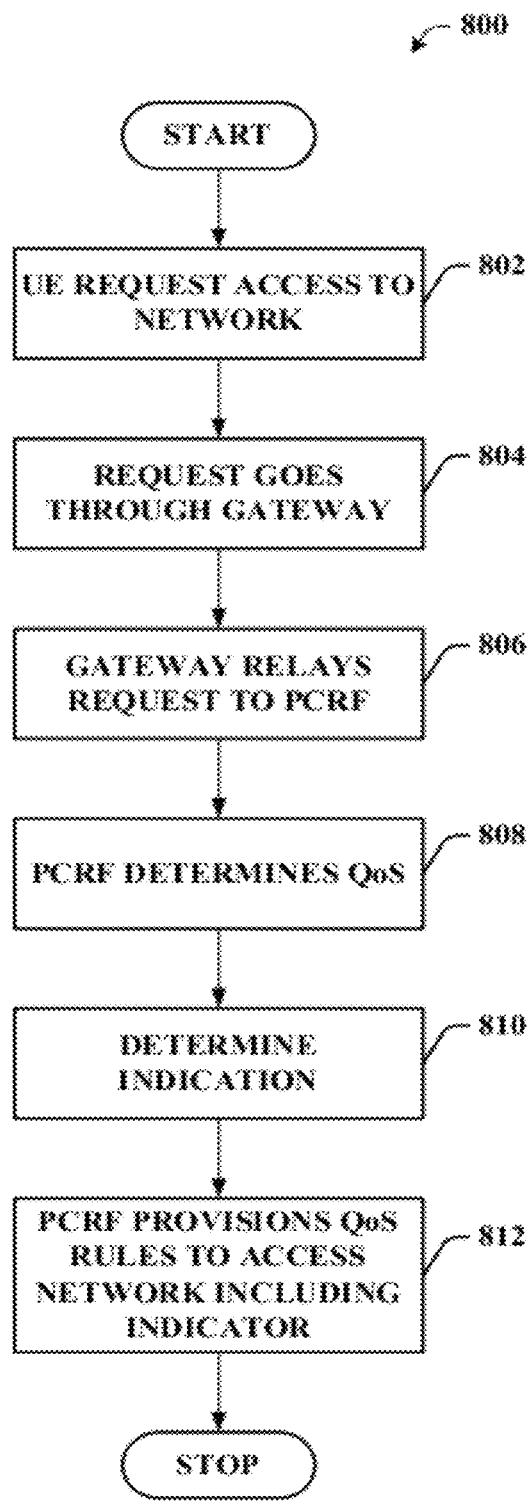
FIG. 8 is a flowchart illustrating an example methodology in accordance with an aspect of the subject specification.
Figure 9:
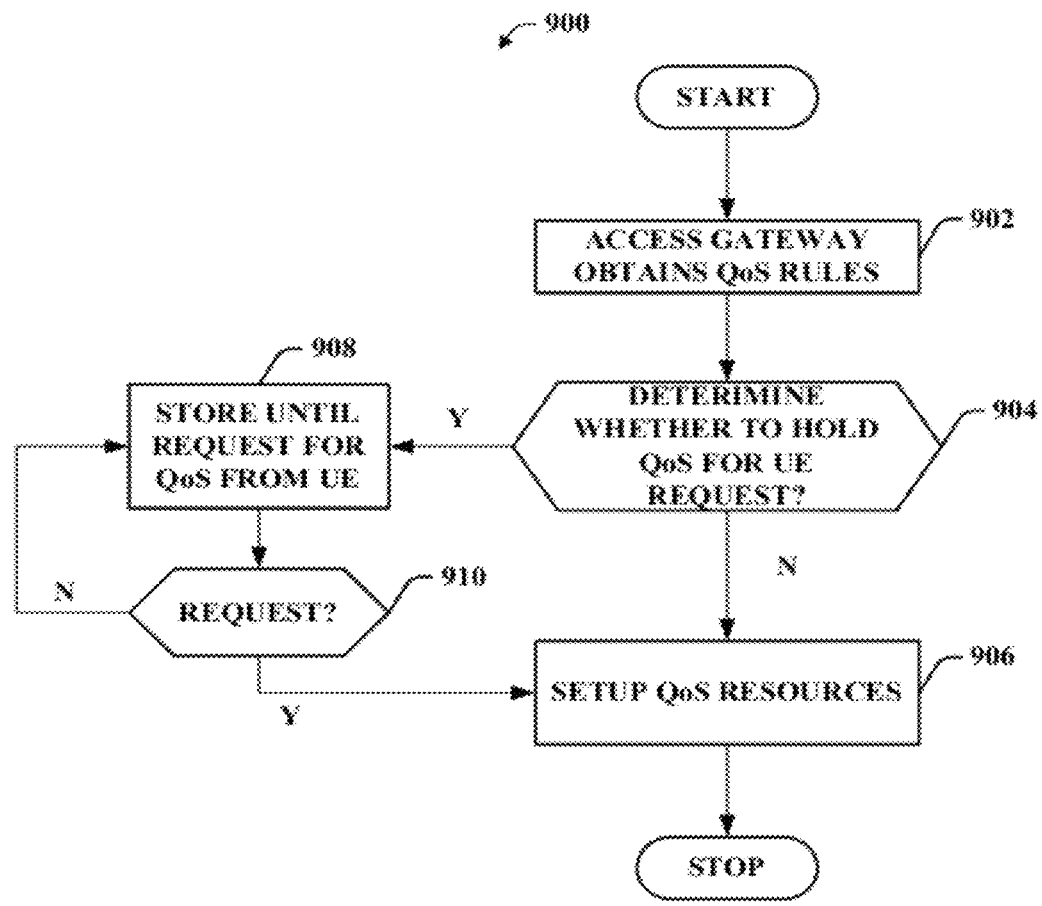
FIG. 9 is an example flow chart illustrating an example methodology in accordance with an aspect of the subject specification.

In view of the example systems described supra, methodologies that may be implemented in accordance with the disclosed subject matter will be better appreciated with reference to the flow charts of FIGS. 8-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 8 is a flowchart illustrating an example methodology in accordance with an aspect of the subject innovation. At 802, a UE can attempt to access a wireless communication network or request resources from the network. Typically, connecting to the network is accomplished via a set of access gateways at 804, such as an access gateway, and a home agent or a packet data gateway (discussed supra). At 806, the access gateway relays the request by the UE to a policy and charging rules function server (PCRF). At 808, the PCRF can determine a set of QoS rules for the UE. For example, the QoS rules can detail the data rate allowed for an IP flow, and so forth.

Additionally, at 810 the PCRF can determine an indication to include with the set of QoS rules that instructs the access gateway to either setup QoS resources corresponding to the QoS rules virtually immediately, or to store the QoS rules until the UE request the QoS resources from the access gateway. As mentioned supra, typically, access gateways assume the UE desires access to the resources instantly, and generates QoS resources based on the QoS rules right away. In accordance with the subject innovation, the access gateway can maintain the QoS rules, and wait to setup the resources until requested by the UE. For example, if the PCRF (discussed supra) is connected to a plurality of access networks (via an access gateway) that the UE is requesting service from, and the PCRF can provide the same QoS rules to each access network for the UE, and typically, each access gateway will setup the QoS virtually right away. However, even if the UE is connected to each access network it may only use one access network at a time for a particular IP flow. Therefore, it may be further desirable to have the indicator (e.g., flag, chunk of code, etc.) in the QoS rules detail the IP flows for which each access gateway should provision resources either immediately or upon receipt of a request from the UE. At 812, the PCRF provisions QoS rules to the access network including the indicator. It should be noted that the UE resource request may be relayed to the PCRF by the HA/PGW while the PCRF provides QoS rules to the AGW. For example, referring briefly to FIG. 5, the UE 502 may send a resource request for an IP flow to the HA/PGW 510, and indicate that the IP flow is to be transferred via AGW 504. The HA/PGW relays the request to the PCRF 508, and the PCRF 508 determines the QoS rules. The PCRF 508 can provide the same QoS rules to both AGW 504 and AGW 506, however, the PCRF includes indication in the QoS rules provided to AGW 506 that the QoS rules do not trigger a bearer setup until a request is received from the UE 502, and identifies the resources that each AGW 504 and 506 should setup. In other words, the resource is immediately allocated by the AGW 504 when it receives the QoS rule without a wait indication.

FIG. 9 is an example flow chart illustrating an example methodology in accordance with an aspect of the subject innovation. At 902, an access gateway can obtain a set of QoS rules from a PCRF (discussed supra). The QoS rules instruct the access gateway to setup QoS resources having certain parameters for one or more mobile devices. For instance, the QoS rules can define a UEs authorized data rate, and so forth. At 904, the access gateway determines whether to hold the QoS rules until the UE sends a request for resources or to setup the QoS resources at its first opportunity based on an indicator included with the QoS rules obtained from the PCRF. At 906, if the indicator is not included, or instructs the access gateway to setup the QoS resources, then the access gateway setups the resources virtually immediately.

At 908, if the indicator instructs the access gateway to hold the QoS rules, then the access gateway stores the QoS rules until it obtains a request for the associated QoS resources from the UE (discussed supra). At 910, the access gateway determines if the UE has sent a request for the QoS resources, and if the UE has requested the resources, then at 906 the access gateway can setup the QoS resources. If the UE has not requested the QoS resources, then the access gateway continues to store the QoS rules at 908 until a request is received.

Figure 10:
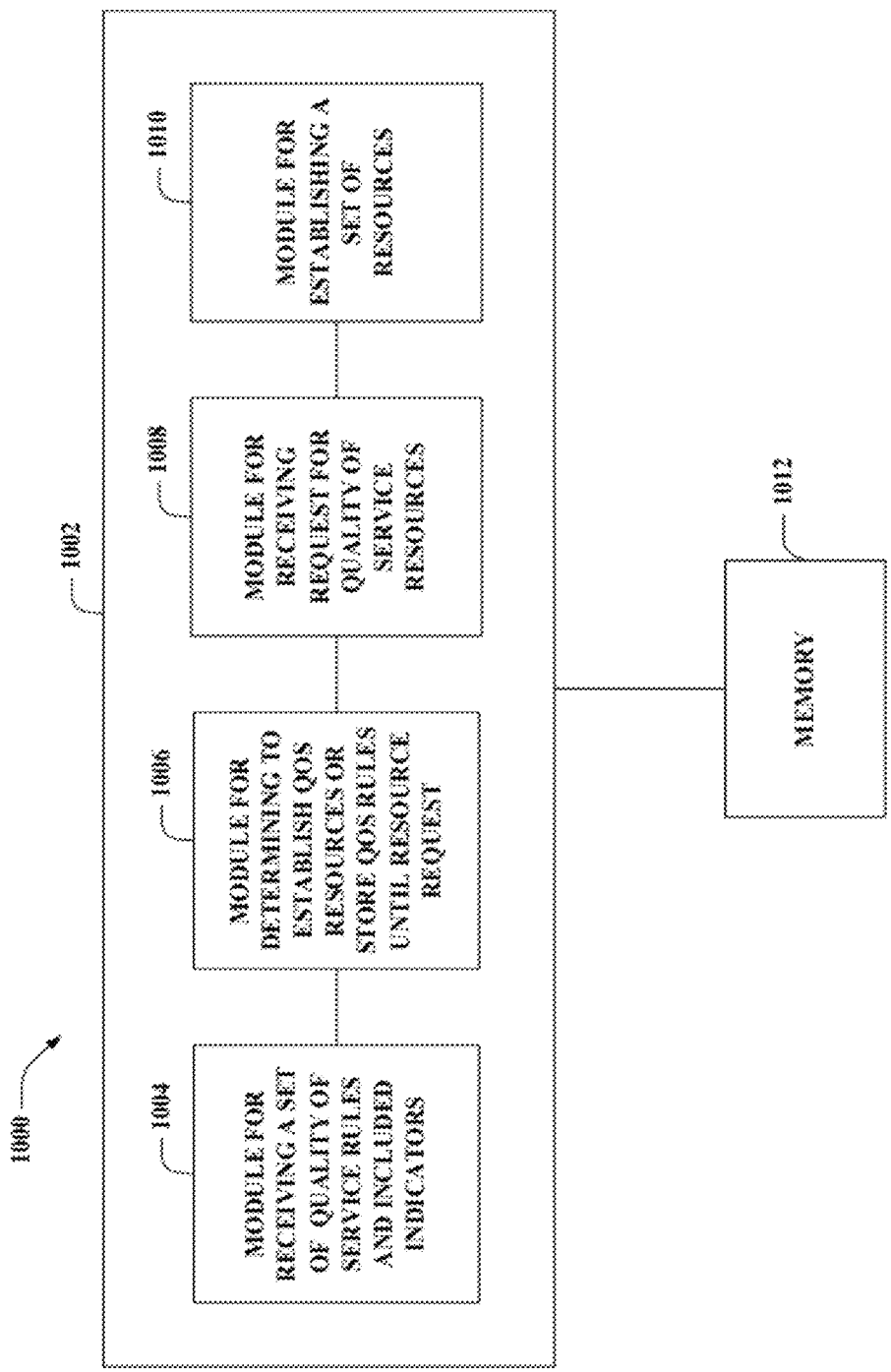
FIG. 10 is an illustration of an example system that facilitates quality of service control over multiple accesses in a wireless communication network in accordance with the subject specification subject specification.

With reference to FIG. 10, illustrated is an example block diagram of a system 1000 that facilitates quality of service control over multiple accesses in a wireless communication system. For example, system 1000 can reside at least partially within an access gateway, a home agent, a packet gateway, etc. It is to be appreciated that system 1000 is represented as including functional blocks, which can be functional blocks that represent functions implemented by a processor, software, or combination thereof (e.g., firmware). System 1000 includes a logical grouping 1002 of modules that can act in conjunction. For instance, logical grouping 1002 can include a module for receiving a set of quality of service (QoS) rules and one or more included indicators 1004. Further, logical grouping 1002 can comprise a module for determining to establish QoS resources (e.g., bearer setup) upon receipt of the QoS rules, or store the QoS rules until a request of QoS resources in received from the associated mobile device, based on the indicators 1006. Moreover, the logical grouping 1002 can include a module for receiving a request for quality of service resources from a mobile device. Additionally, system 1000 can include a module for establishing a set of resources either upon receipt of the QoS rules, or upon receiving a request for QoS resources from a mobile device 1010. Furthermore, system 1000 can include a memory 1012 that retains instructions for executing functions associated with modules 1004, 1006, 1008 and 1010. While shown as being external to memory 1012, it is to be understood that one or more of modules 1004, 1006, 1008, and 1010 can exist within memory 1012.

Figure 11:
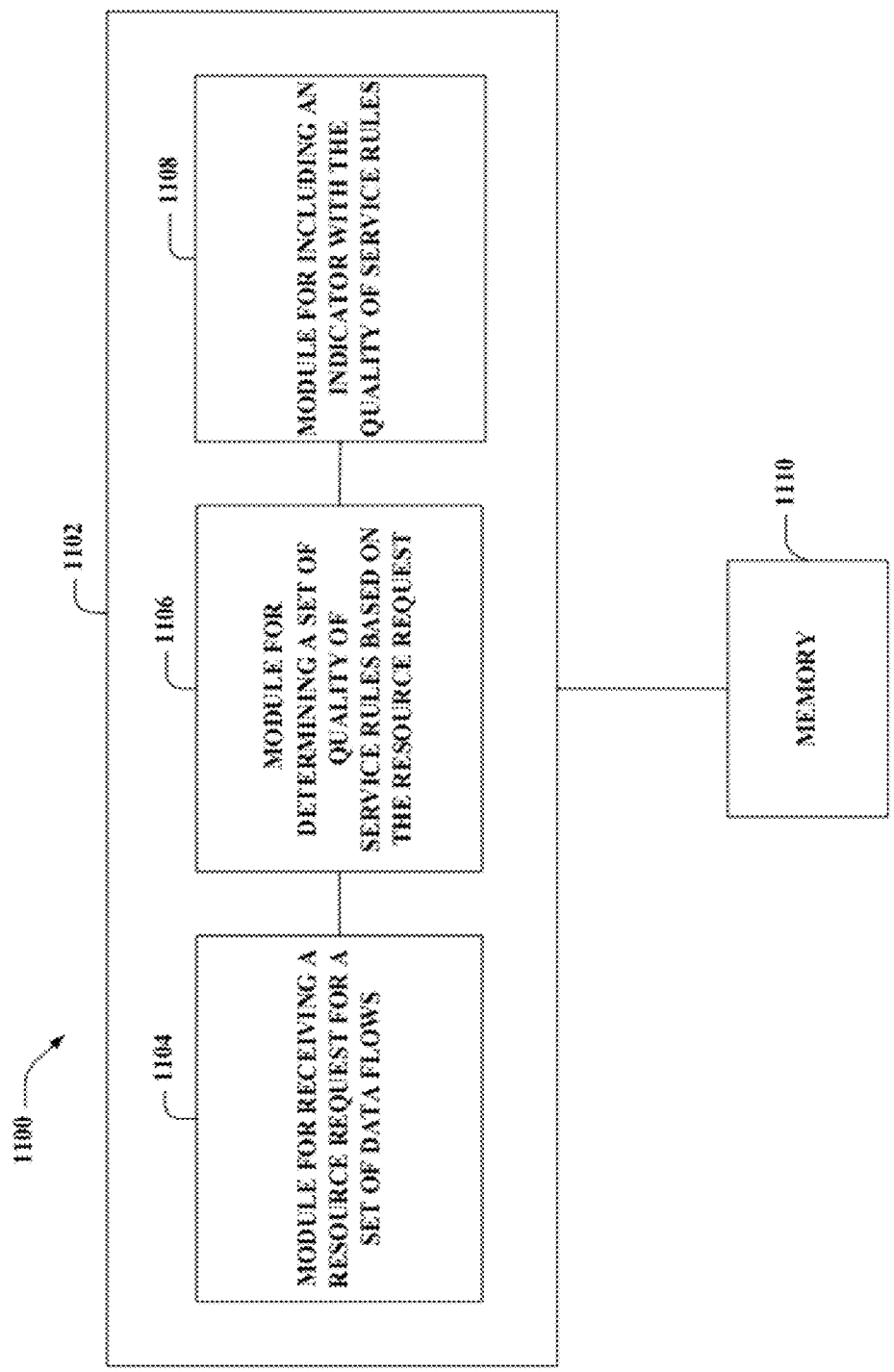
FIG. 11 is an illustration of an example system that facilitates quality of service control over multiple accesses in a wireless communication network in accordance with the subject specification.

With reference to FIG. 11, illustrated is an example block diagram of a system 1100 that facilitates quality of service control over multiple accesses in a wireless communication system. For example, system 1100 can reside at least partially within a policy and charging rules function server, etc. It is to be appreciated that system 1100 is represented as including functional blocks, which can be functional blocks that represent functions implemented by a processor, software, or combination thereof (e.g., firmware). System 1100 includes a logical grouping 1102 of modules that can act in conjunction. For instance, logical grouping 1102 can include a module for receiving a resource request for a set of data flows 1104. Further, logical grouping 1102 can comprise a module for determining a set of quality of service rules based on the resource request 1106. Moreover, the logical grouping 1102 can include a module for including an indicator that instructs the recipient to either setup the quality of service (QoS) resources upon receipt of the QoS rules or to store the QoS rules until a request for the QoS resources is received 1108.

Furthermore, system 1100 can include a memory 1110 that retains instructions for executing functions associated with modules 1104, 1106, and 1108. While shown as being external to memory 1012, it is to be understood that one or more of modules 1104, 1106, and 1108 can exist within memory 1110.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for quality of service (QoS) control over multiple accesses, comprising:
   receiving at least one resource request for a set of data flows from an access terminal, wherein the at least one resource request includes an instruction to have the set of data flows transferred to the access terminal via a first network entity;
   generating a set of QoS rules based at least in part on the at least one resource request for the set of data flows;
   transmitting to the first network entity a first set of QoS rules including the set of QoS rules and a first indicator instructing the first network entity to trigger a bearer setup with the access terminal; and
   transmitting to a second network entity a second set of QoS rules including the set of QoS rules and a second indicator instructing the second network entity to store the set of QoS rules until the second network entity receives a resource request from the access terminal.

2. The method of claim 1, wherein the at least one resource request for the set of data flows is relayed via the first network entity.

3. The method of claim 2, wherein the first network entity includes at least one of an access gateway, a home agent, or a packet gateway.

4. The method of claim 1, wherein the first indicator further identifies a subset of the set of data flows for which the first network entity is to trigger the bearer setup according to corresponding ones of the set of QoS rules.

5. The method of claim 1, wherein the second indicator is further configured to instruct the second network entity to store the set of QoS rules until receipt of an updated set of QoS rules that have an updated indicator.

6. A wireless communication apparatus including at least one processor configured to facilitate quality of service (QoS) control over multiple accesses, comprising:
   a first module for receiving at least one resource request for a set of data flows from an access terminal, wherein the at least one resource request includes an instruction to have the set of data flows transferred to the access terminal via a first network entity;
   a second module for generating a set of QoS rules based at least in part on the at least one resource request for the set of data flows;
   a third module for transmitting to the first network entity a first set of QoS rules including the set of QoS rules and a first indicator instructing the first network entity to trigger a bearer setup with the access terminal, and for transmitting to a second network entity a second set of QoS rules including the set of QoS rules and a second indicator instructing the second network entity to store the set of QoS rules until the second network entity receives a resource request from the access terminal.

7. The wireless communication apparatus of claim 6, wherein the first network entity includes at least one of an access gateway, a home agent, or a packet gateway.

8. The wireless communication apparatus of claim 6, wherein the first indicator further identifies a subset of the set of data flows for which the first network entity is to trigger the bearer setup according to corresponding ones of the set of QoS rules.

9. The wireless communication apparatus of claim 6, wherein the second indicator is further configured to instruct the second network entity to store the set of QoS rules until receipt of an updated set of QoS rules that have an updated indicator.

10. A computer program product, comprising:
a non-transitory computer-readable medium comprising:
   a first set of codes for causing a computer to receive at least one resource request for a set of data flows from an access terminal, wherein the at least one resource request includes an instruction to have the set of data flows transferred to the access terminal via a first network entity;
   a second set of codes for causing the computer to generate a set of quality of service (QoS) rules based at least in part on the at least one resource request for the set of data flows;
   a third set of codes for causing the computer to transmit to the first network entity a first set of QoS rules including the set of QoS rules and a first indicator instructing the first network entity to trigger a bearer setup with the access terminal; and
   a fourth set of codes for causing the computer to transmit to a second network entity a second set of QoS rules including the set of QoS rules and a second indicator instructing the second network entity to store the set of QoS rules until the second network entity receives a resource request from the access terminal.

11. The computer program product of claim 10, wherein the at least one resource request for the set of data flows is relayed via the first network entity.

12. The computer program product of claim 11, wherein the first network entity includes at least one of an access gateway, a home agent, or a packet gateway.

13. The computer program product of claim 10, wherein the first indicator further identifies a subset of the set of data flows for which the first network entity is to trigger the bearer setup according to corresponding ones of the set of QoS rules.

14. The computer program product of claim 10, wherein the second indicator is further configured to instruct the second network entity to store the set of QoS rules until receipt of an updated set of QoS rules that have an updated indicator.

15. An apparatus, comprising:
means for receiving at least one resource request for a set of data flows from an access terminal, wherein the at least one resource request includes an instruction to have the set of data flows transferred to the access terminal via a first network entity;
means for generating a set of quality of service (QoS) rules based at least in part on the at least one resource request for the set of data flows;
means for transmitting to the first network entity a first set of QoS rules including the set of QoS rules and a first indicator instructing the first network entity to trigger a bearer setup with the access terminal; and
means for transmitting to a second network entity a second set of QoS rules including the set of QoS rules and a second indicator instructing the second network entity to store the set of QoS rules until the second network entity receives a resource request from the access terminal.

16. The apparatus of claim 15, wherein the at least one resource request for network access is relayed via the first network entity.

17. The apparatus of claim 15, wherein the first indicator further identifies a subset of the set of data flows for which the first network entity is to trigger the bearer setup according to corresponding ones of the set of QoS rules.

18. The apparatus of claim 15, wherein the second indicator is further configured to instruct the second network entity to store the set of QoS rules until receipt of an updated set of QoS rules that have an updated indicator.

19. An apparatus for quality of service (QoS) control over multiple accesses, comprising:
a request acquisition component that receives at least one resource request for a set of data flows from an access terminal, wherein the at least one resource request includes an instruction to have the set of data flows transferred to the access terminal via a first network entity;
a QoS determination component that generates a set of QoS rules based at least in part on the at least one resource request for the set of data flows;
a transmitter that transmits to the first network entity a first set of QoS rules including the set of QoS rules and a first indicator instructing the first network entity to trigger a bearer setup with the access terminal, and transmits to a second network entity a second set of QoS rules including the set of QoS rules and a second indicator instructing the second network entity to store the set of QoS rules until the second network entity receives a resource request from the access terminal.

20. The apparatus of claim 19, wherein the (QoS) rules are based at least in part on at least one of an identity of an associated mobile device, an identity of the access gateway, and a set of policies.

21. The apparatus of claim 19, the first indicator further identifies a subset of the set of data flows for which the first network entity is to trigger the bearer setup.

22. The apparatus of claim 19, wherein the second indicator is further configured to instruct the second network entity to store the set of QoS rules until receipt of an updated set of QoS rules that have an updated indicator according to corresponding ones of the set of QoS rules.

* * * * *